(No Model.)
T. E. LEWIS.
PLATFORM FOR HARVESTERS.
No. 428,683. Patented May 27, 1890.
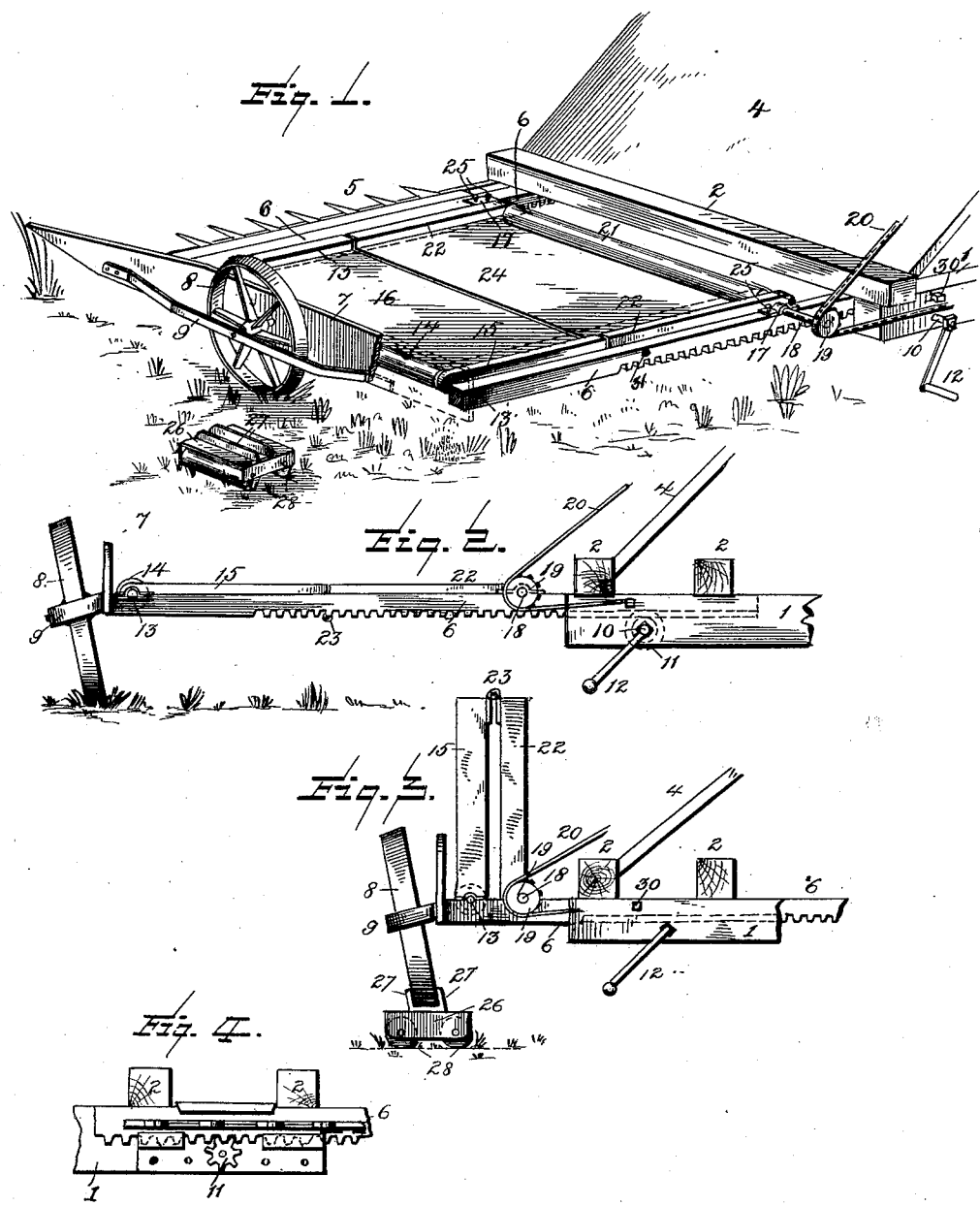

UNITED STATES PATENT OFFICE.

THOMAS E. LEWIS, OF DUBLIN, TEXAS.

PLATFORM FOR HARVESTERS.

SPECIFICATION forming part of Letters Patent No. 428,683, dated May 27, 1890.

Application filed September 26, 1888. Serial No. 286,429. (No model.)

*To all whom it may concern:*

Be it known that I, THOMAS E. LEWIS, a citizen of the United States, residing at Dublin, in the county of Erath, State of Texas, have invented certain new and useful Improvements in Platforms for Harvesters, of which the following is a specification, reference being had therein to the accompanying drawings.

This invention has relation to harvester-binders, and has particular reference to the platform thereof or that portion designed to receive the grain as it is cut by the reaping mechanism; and among the main objects in view is to provide a platform located in rear of the reaping mechanism that is capable of being contracted and extended, and also to provide other parts that may be withdrawn inward, whereby the machine, as a whole, is decreased in width, and its passage through farm-gates from field to field and over unbroken ground is facilitated.

A further object of the invention is to provide a simple and convenient mechanism for accomplishing the above.

Other objects and advantages of the invention will hereinafter appear, and the novel features thereof will be particularly pointed out in the claims.

Referring to the drawings, Figure 1 is a perspective of a portion of a harvester, the front sill being removed and its cutting or reaping mechanism provided with a platform constructed in accordance with my invention, and a like view of a truck adapted for supporting the outer end of the platform when being contracted or extended. Fig. 2 is a rear elevation of the same, the platform being open or extended; and Fig. 3 is a similar view, the platform being contracted or folded, the truck being in position for supporting the same. Fig. 4 is a detail in front elevation, showing a portion of the main frame, cutting apparatus, and rack-bar.

Like numerals of reference indicate like parts in all the figures of the drawings.

1 represents the usual front and rear longitudinal beams of a harvester, which are connected at their ends by the cross-beams 2, the frame thus constructed serving to support the elevator or inclined table 4, these parts being of any well-known construction and liable to variance in accordance with the type of harvester to which my invention is to be applied.

At the front of the machine, and to one side of the elevator 4, there is located the usual reaping mechanism 5, consisting of the usual finger-bar and knives, and operated in any ordinary manner.

Mounted for reciprocation in ways or guides secured to or formed upon the forward surfaces of the longitudinal beams 1, or it may be to any other part of the machine, are opposite reciprocating rack-bars 6, having a series of teeth formed upon their under edges for a portion of their lengths, said bars being connected at their outer ends by a shield or flanged guard 7, and supported by a ground-wheel 8, guarded by an outwardly-extending guard-strip 9. The finger-bar is preferably made rigid with the front rack-bar 6 and moves therewith, said finger-bar being in front of the rack-bar.

A shaft 10 is journaled transversely in the two longitudinal beams or bars 1 and carries opposite pinions 11, which mesh with the rack-bars 6, said shaft also being provided with a suitable operating-crank 12.

Journaled in bearings in the outer ends of the opposite rack-bars 6 is a rod or shaft 13, upon which is mounted for rotation a roll 14, and pivoted to said rod or shaft are opposite arms or side frames 15, having an intermediate leaf or table portion 16.

At a point upon each of the rack-bars 6, adjacent to the frame of the machine, there are provided removable bearings 17, in which is journaled a rod or shaft 18, carrying a sprocket 19 at one end adapted to be rotated by a chain 20, leading from the driving mechanism, and also carrying an intermediate roll 21, similar to the roll 14, and opposite arms 22, united to the arms 15 by hinges 23, and also provided with an intermediate leaf or table portion 24. Over the rolls 14 and 21 extends the usual endless belt. (Shown in dotted lines.)

The operation of my invention is as follows: To decrease the width of the machine for the before-mentioned purposes, the pins 25 or other securing devices are removed, so as to disconnect the bearings 17 from the rack-bars 6, and also the bolt 30 for holding the platform in position. The crank 12 is turned by hand and the rack-bars drawn inwardly until the rear ends of the arms or bars 22 abut against the beam 2, (the joint in the arms having been broken,) and the platform raised where the arms are hinged until it assumes the position shown in Fig. 3, at which time the bolt-hole 31 registers with and receives the bolt 30 and the rack-bars are locked against withdrawal. To extend the platform, the operation just described is reversed.

The breaking of the platform may be accomplished entirely by hand, or it may be accomplished by first breaking the joint and throwing the adjacent ends of the section slightly upward, when they will be forced into the position in which they are shown in Fig. 3 by the engagement of the beam 2 with the ends of the bars 22 of the roller 21.

In the reciprocations of the rack-bars, and in order to prevent the ground-wheel 8 from dragging, I place thereunder a small truck 26, which is formed with wheel-embracing flanges 27 and rollers 28.

Having described my invention, what I claim is—

1. The combination, with the frame-work of a harvester, of opposite longitudinally-movable rack-bars projecting therefrom, a jointed platform pivoted in the rack-bars, and a crank-shaft mounted on the frame carrying pinions for operating in the teeth of said bars, substantially as specified.

2. The combination, with the frame of a harvester, of oppositely-located rack-bars mounted to reciprocate therein, a crank-shaft having pinions adapted to operate the rack-bars, a jointed platform pivoted in the bars, and cutting mechanism mounted upon one of the bars and adapted to reciprocate therewith, substantially as specified.

3. The combination, with the frame-work of a harvester, of oppositely-located reciprocating rack-bars projecting therefrom, and a platform formed of two sections, the outer end of one section being pivoted in the ends of the rack-bars and hinged to the opposite section, and the latter section being removably connected with said bars, substantially as specified.

4. The rack-bars 6, in combination with the rod 13, carrying the roll 14, and arms 15, pivoted thereon and having the leaf 16, and the arms 22, having the leaf 24 and hinged to leaf 16, and having the rod 18 removably connected to the bars 6 and carrying the roll 21 and sprocket 19 and the chain 20, substantially as specified.

In testimony whereof I affix my signature in presence of two witnesses.

THOMAS E. LEWIS.

Witnesses:
T. E. DAVIES,
W. R. YOUNG.